T. M. HEALEY.
Endless Carrying-Belt.
No. 203,825. Patented May 21, 1878.
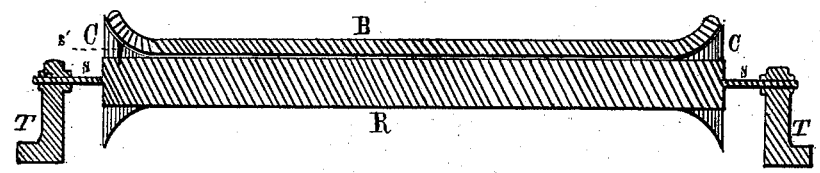
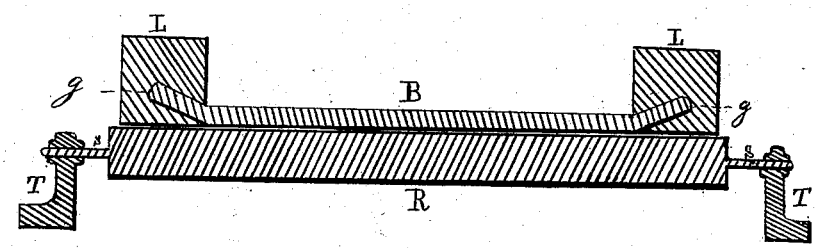
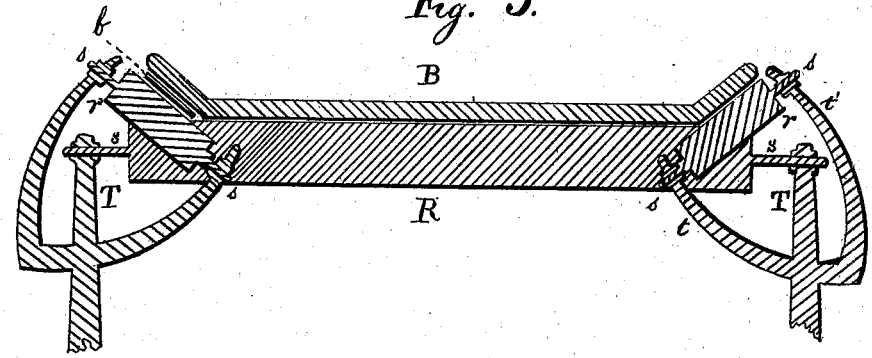

UNITED STATES PATENT OFFICE.

THOMAS M. HEALEY, OF WASHINGTON, DISTRICT OF COLUMBIA.

IMPROVEMENT IN ENDLESS CARRYING-BELTS.

Specification forming part of Letters Patent No. 203,825, dated May 21, 1878; application filed April 20, 1878.

*To all whom it may concern:*

Be it known that I, THOMAS M. HEALEY, of Washington, District of Columbia, have invented certain new and useful Improvements in Endless Carrying-Belts; and I do hereby declare that the following is a full, clear, and exact description of my invention, which will enable others skilled in the art to which it appertains to make and use the same, reference being had to the accompanying drawings, and to letters of reference marked thereon, which form a part of this specification.

Figures 1, 2, and 3 are sectional views of my said improvement.

Like letters represent like parts.

My invention relates particularly to that class of machines where endless belts are needed or useful for carrying or conveying or elevating purposes.

In the drawings, B is a belt, supported, if necessary, upon a roller, R, which revolves on bearings $s$ in suitable supports T. The belt B is provided with a grooved ledge, L, of soft, vulcanized, or plain rubber or other suitable material, into which the edge of the belt B is inserted and fastened, either by the spring of the materials or by suitable pegs, pins, or rivets, or sewed therein, or cemented by rubber or other cements, so that the ledge can be removed at will, and attached to another belt in case the belt should become defective or it should become desirable to so change it, or so that any portion of said ledge, upon being defective, can be removed.

The groove $g$ can be made in the ledge L when the same is made of rubber, or it can be afterward sawed or cut therein by a saw or knife. In this manner a plain ordinary belt can be converted into a ledged belt at will, and at very slight expense.

Two other methods of accomplishing a like result are shown in Figs. 2 and 3, wherein R is a roller, as in Fig. 1, provided, as shown in Fig. 2, with flaring collars C, which are adjustable by means of the set-screws $s'$ to any desired width of belting. By means of the flaring edges of these collars the edges of the belt B are turned up, so as to make a ledge of the belt itself.

In Fig. 3, the roller $r$, in suitable bearings $t$ $t$, is set at any desired angle with the belt B, and turns up the edges of the belt B, as does the collar in the previous figure.

Where considerable stretches or lengths of belts are to be used, a belt, $b$, can be run on the rollers $r$, as shown, and thus the number of these can be lessened. The small rollers $r$ can be set at any distance from the end of the roller R to suit any width of belting.

Endless belts so ledged can be used for carrying and elevating grain in grain-elevators, coal, and sawdust, and for ore-beds in ore-washing machines, and all other analogous uses.

I do not claim, broadly, as of my invention endless ledged belts; but

What I do claim, and desire to secure by Letters Patent, is—

1. The endless belt B, having grooved edge ledges L L, together forming an endless ledged belt, constructed to operate as and for the purposes described.

2. The carrying-rollers R, having adjustable collars C, in combination with the endless belt B, as and for the purposes described.

3. The angular and revolving edge-carrying rollers $r$ $r$ and revolving rollers R, in combination with the endless belt B, as and for the purposes described.

4. The endless belt $b$, angular rollers $r$, and carrying-rollers R, in combination with the endless belt B, as and for the purposes set forth.

5. As a new article of manufacture, the grooved rubber ledge L.

In testimony that I claim the foregoing as my own I affix my signature in presence of two witnesses.

THOS. M. HEALEY.

Witnesses:
 FRANCIS W. MILLER,
 HENRY R. ELLIOTT.